June 25, 1963 E. C. B. CORLETT 3,094,963
MARINE TANKERS
Filed April 1, 1958 4 Sheets-Sheet 1
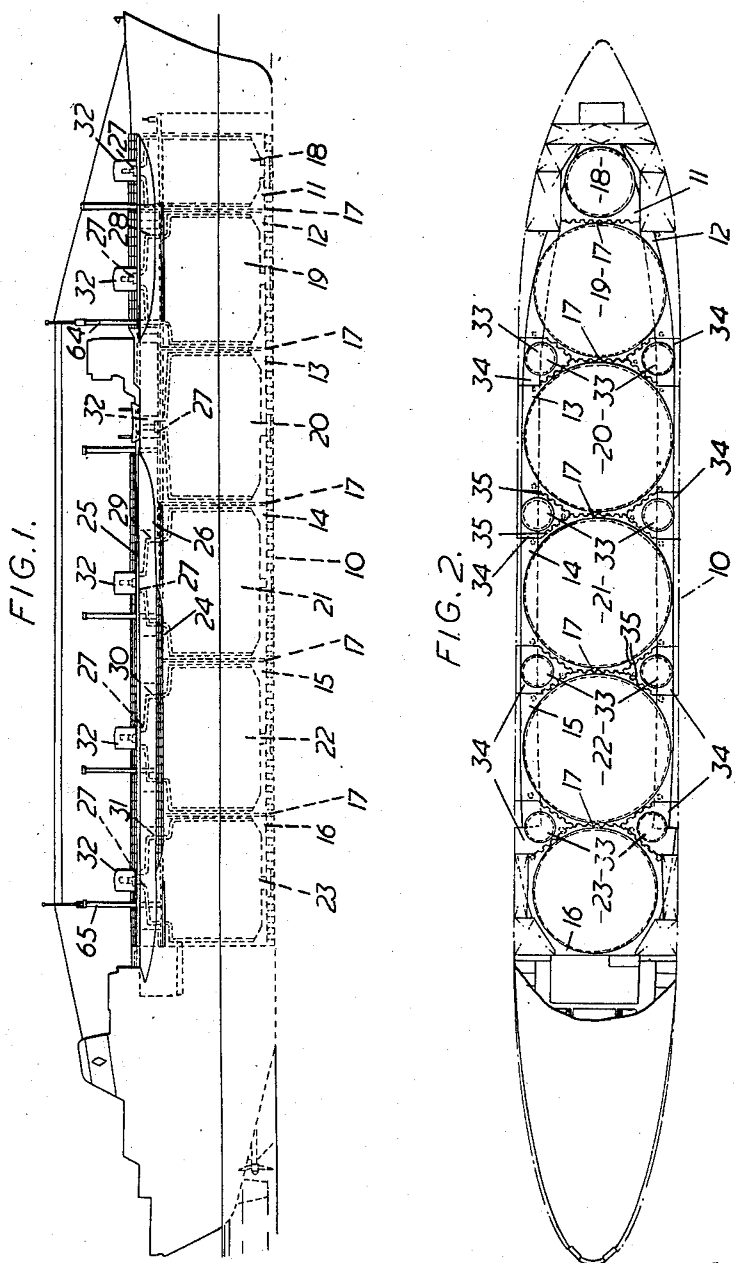
Inventor
Ewan C. B. Corlett
By Dowell & Dowell
Attorneys June 25, 1963 E. C. B. CORLETT 3,094,963
MARINE TANKERS
Filed April 1, 1958 4 Sheets-Sheet 2
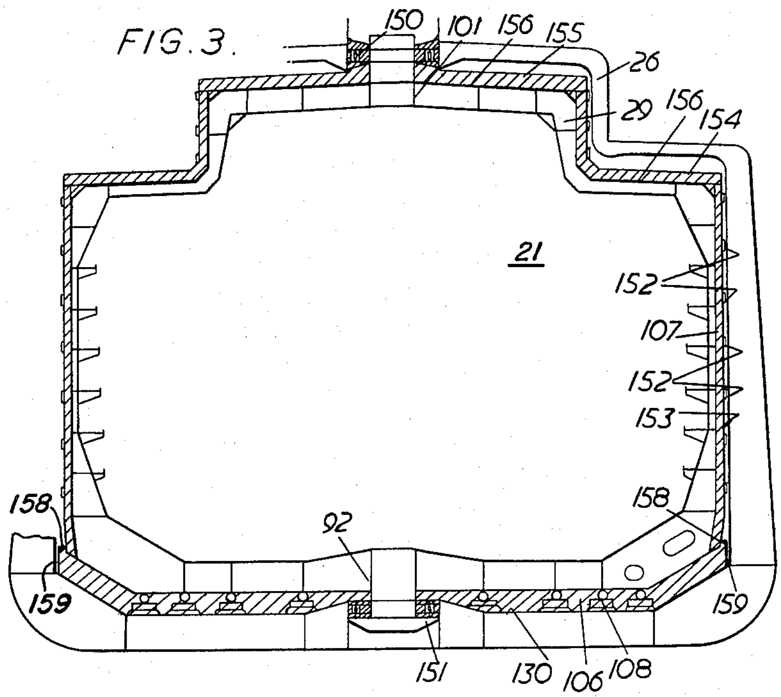
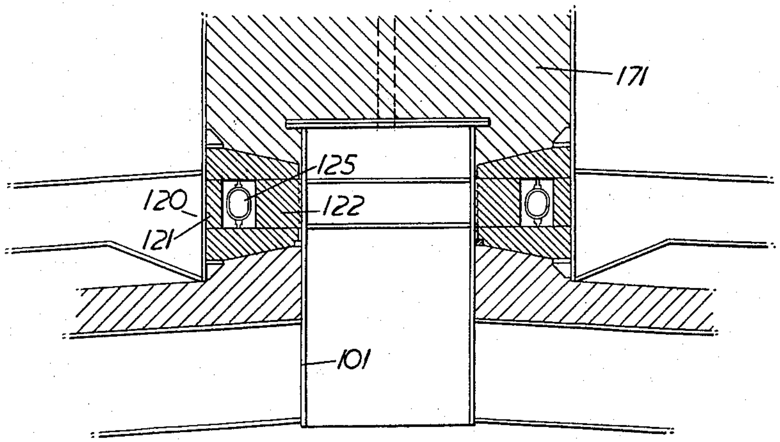
Inventor
Ewan C. B. Corlett
By Dowell & Dowell
Attorneys

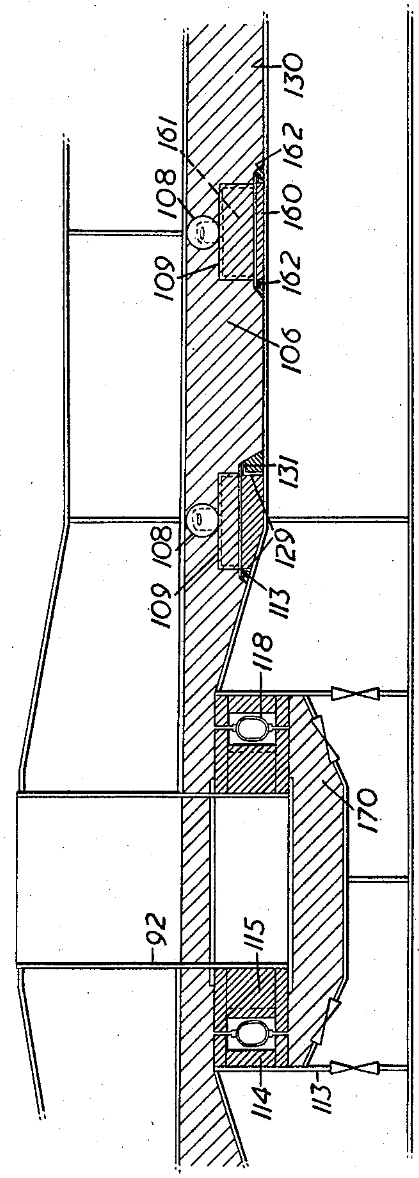
Inventor
Ewan C. B. Corlett
By Dowell & Dowell
Attorneys

June 25, 1963 E. C. B. CORLETT 3,094,963
MARINE TANKERS
Filed April 1, 1958 4 Sheets-Sheet 4
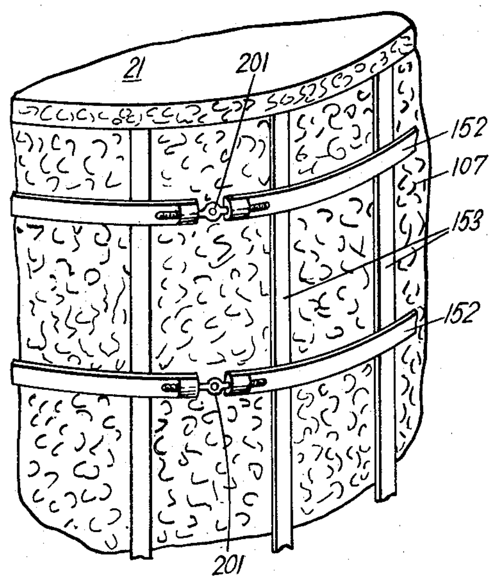
Inventor
Evan C. B. Corlett
By Dowell & Dowell
Attorneys United States Patent Office 3,094,963

Patented June 25, 1963

3,094,963
MARINE TANKERS

Ewan Christian Brew Corlett, Worting Park, near Basingstoke, England, assignor to Wm. Cory & Son Limited, London, England Filed Apr. 1, 1958, Ser. No. 725,676
Claims priority, application Great Britain Apr. 5, 1957
8 Claims. (Cl. 114—74)

This invention relates to water-borne tankers, particularly ocean-going tankers, for the transport in liquid form at low temperature and approximately atmospheric pressure of substances which are normally in a gaseous state. The gas which comes mainly into question is methane, but the references herein to methane are, wherever the context allows, to be read as references also to like gases which it may be desirable to transport in the liquid state.

For reasons which do not require discussion here, it is advantageous for liquid methane to be carried in a number of large insulated metal tanks each of which extends across practically the full breadth of the ship. The present invention is particularly applicable to a tanker of this construction, and is concerned with the question of tank insulation.

In order that evaporation of the liquid methane contained in the tanks may be on as reduced a scale as possible, the insulation for each tank should be capable of preventing the passage of ambient heat into the tank rising to a value which results in evaporation of, say, more than one quarter percent per day of the total contents of the tank. At first sight, this appears to be a question only of what thickness of insulation should be provided, but in the case of large methane tanks the walls of a tank may contract by several inches when it is loaded with liquid methane (which has a boiling point of minus 260° F.), and the insulating material has therefore to adapt itself to the thermal expansion and contraction of the tank. An object of the invention is to provide a form of insulation which meets this two-fold requirement.

According to the present invention, there are provided, in a marine tanker for the bulk transport in the liquid state at low temperature of methane (or like ordinarily-gaseous substances), one or more externally-insulated cargo tanks the insulation for the circumferential wall of each of which is in the form of a resilient coherent material such as glass fibre matting, which is in a state of being compressed against the tank surface when the tank is in its thermally expanded condition, so as to be able to itself expand to follow the tank movement when the tank contracts, the extent of the compression being sufficient to allow the full thermal contraction of the tank to occur without the insulation breaking contact with the tank surface.

In the preferred form, the insulation comprises glass fibre matting clamped on to the external tank surface by circumferential bands of which the circumferential length can be adjusted to impose the required degree of compression on the insulation.

The above and other features of the invention will be apparent in the following description, given by way of example, of one embodiment in accordance with the invention, reference being had to the accompanying drawings in which:

FIGURE 1 shows in elevation a marine tanker for the transport of methane,

FIGURE 2 is a plan showing the arrangement of the methane tanks in the holds,

FIGURE 3 is a cross-sectional elevation of one of the main cargo tanks and its installation, FIGURE 4 is a sectional elevation of a detail of the tank bottom, FIGURE 5 is a sectional elevation of a detail of the tank top, and FIGURE 6 is a perspective view of a portion of the tank circumferential insulation.

Referring firstly to FIGURES 1 and 2, the cargo-carrying section of the tanker hull 10 is divided into six separate main hold compartments 11 to 16 by a series of transverse bulkheads 17.

Disposed individually in the hold compartments 11 to 16, in a closely-spaced row along the fore-and-aft centre line of the vessel are six main cargo tanks 18 to 23. These main tanks are, for the most part, substantially cylindrical in form with their principal axes vertical, and in general they extend at their widest parts for substantially the whole width of the vessel although tanks 19 and 23 are somewhat less in diameter than tanks 20, 21 and 22, and the most forward tank 18 is a good deal less in diameter.

The vessel is of turret construction, that is to say it has a main deck at the level 24 and a narrower turret deck above at the level 25. Each of the main tanks 18 to 23 extends up through the main deck at level 24, and, with the exception of the tank 20, the portions of the tanks that protrude above the main deck are as large in diameter as can be conveniently accommodated within the turret structure 26. To this end, tanks 19, 21, 22 and 23 have stepped-in upper portions 28, 29, 30 and 31, but the forward tank 18, being already relatively narrow, does not need to be stepped-in. Each of the six tanks terminates at its upper end in a narrow neck 27 surmounted by a pump motor housing 32. In the case of the five tanks 18, 19, 21, 22 and 23 the narrow tank neck 27 reaches up through the turret deck at level 25 and the housing 32 is situated on said deck, but the tank 20, for reasons which need not be discussed here, is not as high as the other five, having its neck 27 terminating only just above the main deck level 24 and its pump motor housing 32 disposed on the main deck within the turret structure.

Owing to the circular plan form of the main tanks 18 to 23, there is an appreciable space below decks between one tank and the next at opposite sides of the vessel, and in the case of tanks 19 to 23 these spaces between are utilised by disposing in them eight additional wing tanks 33 of much smaller capacity. The wing tanks 33 are all cylindrical with their principal axes upright, and are located wholly below the main deck level 24. As will be seen in FIGURE 2, the arrangement of bulkheads between the main tanks 19 to 23 is such that each wing tank 33 has its own individual water-tight hold compartment 34, each of the bulkheads 17 branching, as it were, into two diverging bulkheads 35 to embrace a wing tank as it approaches each side of the hull.

FIGURE 3 shows the arrangement of one of the large main cargo tanks, say the tank 21, and its installation in the ship's hull. In order that it shall be free to expand and contract radially, the tank rests on a large number of short rollers 108 arranged in radial and circumferential rows beneath it, and it is also provided with top and bottom centre integral locating spigots 101, 92 which are received in seatings 150, 151 of the ship's structure to hold the tank against lateral bodily displacement.

The sides of the tank are insulated by glass fibre matting, such as that sold under the trade name "Fiberglas," which is clamped against the tank by circumferential aluminium bands 152 spaced at regular intervals throughout the height of the main body of the tank. The glass fibre matting is resilient and is under compression by the bands 152 when the tank is in its thermally expanded condition, that is to say at ordinary atmospheric temperature. This pre-compression is applied by means of turn-buckles 201 (FIGURE 6) in the bands having oppositely-threaded ends, whereby the circumferential lengths of the bands can be reduced. The amount of compression applied to the matting 107 is such that, when the tank is loaded and contracts, the insulating matting can expand and thereby remain in contact with the contracting skin of the tank, this ocurring all the way down to the fully-contracted condition of the tank at its working temperature so that the insulation never breaks contact with the tank surface.

In a tanker of about 16,600 tons methane deadweight, the tank illustrated in FIGURE 3 will have a capacity of about 280,000 cubic feet, and the total thermal contraction across its diameter will be approximately 5″. Depending upon the temperature obtaining when the matting insulation 107 is fitted the pre-compression of the matting applied by the bands 152 will be approximately 2½″ to 3″, and the actual thickness of the compressed insulation about 10″ to 10½″. This gives an insulation thickness expanded to approximately 13″ at the cold working temperature of the tank, which is ordinarily sufficient to keep the boil-off rate of the liquid methane in the tank down to a ¼% per day, assuming that the insulation elsewhere around the tank is equally as good.

To keep the glass fibre matting 107 properly in place, vertical aluminium strips 153 interposed between the insulation and the circumferential bands 152, are spaced at regular intervals all around the tank, so as to form a lattice with the bands 152. In general, these vertical strips will be spaced at intervals of about 2 feet. The upper section 29 of the tank within the turret 26 is insulated in similar fashion.

The top faces or shoulders of the tank 154, 155 may be insulated by the use of glass fibre matting, or by means of cellular insulating material in block form such as that known under the trade name "Jablite."

A considerable clearance space, of the order of 2′6″, is provided between the tank bottom and the ship's inner bottom 130, and this space is filled with a granular insulating material, such as that known under the trade name "Santocel." At all the tank corners ample overlapping of the insulating material is allowed to prevent any discontinuity arising during expansion and contraction, and in the case of the granular insulation 106 at the tank bottom this is carried out beyond the side insulation 107 as at 158, being retained by steel dam walls 159 attached to the ship's structure. This makes for ease of filling of the space under the tank with the granular insulant, and provides feeder capacity to take account of any "shake down" of the insulant during working.

The rollers 108 on which the tank rests are made of a load-bearing electrical and heat-insulating material, such as that known under the trade name "Permali," and are mounted on hollow aluminium stools 109 bolted down on to steel ground bars 129 on the ship's bottom 130. Pads 131 of load-bearing heat- and electrical-insulating material, such as that known under the trade name "Tufnol," are interposed between the stools and the ground bars. Blocks of solid insulating material, such as that known under the trade name "Jablex," are placed between the ground bars 129 at 160, and the spaces 161 inside the hollow stools 109 and above the blocks 160 are filled with granular insulant poured in through a suitable aperture. There are also fairing pieces 162 of "Jablex" or the like arranged around the ground bars 129 to ensure that the granular insulation 106 runs readily in the under-tank space and that there are no pockets likely to be left unfilled.

Each of the tank spigots 92, 101 is surrounded by a steel ring or sleeve 113, 120 (FIGURES 4 and 5) forming part of the ship's structure, the spigot seatings being provided by these sleeves and concentric rings of load-bearing heat-insulating material such as "Permali," located in the annular spaces between the sleeves 113, 120 and the spigots 92, 101. The "Permali" rings 114, 115 of the lower spigot seating have between them hydraulic cushions 118, and similarly the "Permali" rings 121, 122 of the upper seating may also, if desired, enclose hydraulic cushions 125. The inner "Permali" rings 115, 122 engage the spigots while the outer rings 114, 121 engage the sleeves 113, 120, and the arrangement of each seat is designed to constrain the spigot firmly while at the same time providing for its radial expansion and contraction when necessary. The upper seating also allows for vertical thermal movement of the tank. A space below the bottom tank spigot 92 and its seating is filled with granular insulation 170, while the sleeve 120 surrounding the top spigot 101 is continued above the spigot and its seating and is also filled with granular insulation 171.

The same general principles described above in connection with the main cargo tanks are employed in insulating the small wing tanks 33. It will be appreciated that the technique of insulation according to the invention is applicable to widely varying shapes of tank, but is particularly useful in the case of upright cylindrical tanks of the kind described. The resilient matting insulation for the circumference of the tanks is considerably better than block insulation, which gives difficulties with regard to following of the thermal movement, and granuular insulation, which tends to pack down, and lose its insulating properties. Granular insulation, however is suitable for the under-tank space because it can flow around the supports, and block insulation is effective at the tank top. The amount of compression to which the resilient matting round the sides of the tank is subjected will, of course, vary according to the temperature range and the size of the tank.

Although the tanker arrangement specifically described herein is designed with a special view to the accommodation of liquid methane cargo tanks, it will be appreciated that the nature of the tanks and their installation is such that it is not necessary that a vessel for use as a methane carrier should be newly built for this sole purpose. Thus, it is possible to adapt an existing oil tanker to methane carriage by the installation in it of tanks insulated according to the invention.

I claim:

1. In a marine tanker for the bulk transport in the liquid state at low temperature of methane or like ordinarily-gaseous substance, at least one externally-insulated cargo tank having a circumferential wall the insulation for which is in the form of a resilient coherent material such as glass fibre matting, which is in a state of being compressed against the tank surface when the tank is in its thermally expanded condition, so as to be able to itself expand to follow the tank movement when the tank contracts, the extent of the compression being sufficient to allow the full thermal contraction of the tank to occur without the insulation breaking contact with the tank surface, and wherein circumferential bands are provided around said circumferential wall to clamp the insulation on to the external tank surface and of which the circumferential length can be adjusted to impose the required degree of compression on the insulation.

2. A tanker as claimed in claim 1, wherein the tank, at least in its main part, is of upright cylindrical form, and said clamping bands for the insulation are provided at regular intervals over its height.

3. A tanker as claimed in claim 2, wherein upright strips are provided at regular intervals around the tank, between the circumferential clamping bands and the insulation, to form a lattice with said bands.

4. In a marine tanker for the bulk transport in the liquid state at low temperature of methane or like ordinarily-gaseous substance, at least one externally-insulated cargo tank having a circumferential wall the insulation for which is in the form of a resilient coherent material such as glass fibre matting, which is in a state of being compressed against the tank surface when the tank is in its thermally expanded condition, so as to be able to itself expand to follow the tank movement when the tank contracts, the extent of the compression being sufficient to allow the full thermal contraction of the tank to occur without the insulation breaking contact with the tank surface, there being further provided steel ground bars on the ship's inner bottom, a plurality of hollow stools secured down to said ground bars, a roller mounted on each said stool which rollers have the tank resting on them and are made of a load-bearing electrical- and heat-insulating material, insulation in block form disposed between the ground bars, and granular insulating material filling the remainder of the space between the tank bottom and the ship's inner bottom and occupying space within each stool above the block insulation.

5. A tanker as claimed in claim 4, wherein fairing pieces of block insulating material are disposed around the steel ground bars, for the purpose described.

6. A tanker as claimed in claim 5, wherein pads of load-bearing insulating material are interposed between the stools and the ground bars.

7. An insulated tank assembly for liquefied gas at low temperature comprising an upright cylindrical tank, a coherent jacket of resilient insulating material like glass fibre matting disposed externally around the tank circumferential wall, and insulation retaining means including encircling bands around the insulating jacket and upright strips disposed at intervals around the tank between the bands and the insulation, said encircling bands being preadjusted to a diameter whereat they maintain the insulating material in precompression against the tank surface when the tank is in its thermally expanded condition whereby as the tank contracts thermally the resilient jacket of insulating material expands inwardly and increases in thickness to follow the tank movement while the external diameter of the jacket remains constant, the degree of precompression applied to the jacket by the encircling bands being sufficient to cause the resilient insulation to expand enough to take up the full thermal contraction of the tank without the insulation breaking contact with the surface of the tank.

8. A tank assembly as claimed in claim 7, wherein the top surfaces of the tank are insulated by insulating material in block form.

References Cited in the file of this patent

UNITED STATES PATENTS

| | | |
|---|---|---|
| 1,140,250 | Cabot | May 18, 1915 |
| 2,214,294 | Day | Sept. 10, 1940 |
| 2,323,297 | Collins | July 6, 1943 |
| 2,520,883 | Kornemann et al. | Aug. 29, 1950 |
| 2,550,886 | Thompson | May 1, 1951 |
| 2,600,015 | McLaughlin | June 10, 1952 |
| 2,729,357 | Nason et al. | Jan. 3, 1956 |
| 2,746,578 | Blomeley | May 22, 1956 |
| 2,798,364 | Morrison | July 9, 1957 |
| 2,799,425 | Werker | July 16, 1957 |
| 2,823,822 | Altman | Feb. 18, 1958 |
| 2,892,564 | Morrison | June 30, 1959 |
| 2,896,416 | Henry | July 28, 1959 |
| 2,928,565 | Glasoe | Mar. 15, 1960 |
| 2,933,902 | Howard | Apr. 26, 1960 |
| 2,954,003 | Farrell et al. | Sept. 27, 1960 |